Patented June 5, 1951

2,555,945

UNITED STATES PATENT OFFICE 2,555,945

METHOD OF PROCESSING YEAST

Alfred M. Thomsen, San Francisco, Calif.

No Drawing. Application June 5, 1945,
Serial No. 597,713

1 Claim. (Cl. 195—98)

The value of yeast in nutrition is too well known to require anything further than a mere statement of the fact. The value of the resident vitamins is well known and so is the digestibility of its proteins and carbohydrates.

While there are species of yeasts that are better flavored than others, yet the "yeasty" taste is predominant to such an extent that in spite of its merits yeast has not yet become an important factor in human nutrition. It is the aim of my process to so treat yeast that it will become an acceptable food product without seriously impairing either its vitamin content or the digestibility of its resident proteins and carbohydrates.

I accomplish my purpose by dehydrating the yeast commingled with oil under sub-atmospheric pressures. In this manner the vitamins are fully conserved and a distinct and very pleasing flavor is imparted to the yeast. Naturally, the flavor of the oil itself becomes a part, so I prefer a highly refined and winterized product of the non-drying or semi-drying oil class, and entirely bland by being freed from almost all of its free fatty acids. Olive oil, cotton seed, soya bean, peanut, and even mineral oil may be used at will if all are sufficiently refined.

In performing the dehydration I prefer to work with an excess of oil, preheated and then commingled with the yeast, so that the mixture may be drawn into a vacuum chamber and the resident moisture evaporated through the medium of the heat resident in the oil. In this manner all exposure of the yeast to heated surfaces employed in heat transmission is obviated.

The substantially water free product is then separated into the yeast and oil components, for example by filtering and pressing, or by solvent extraction if it be desired to remove all the oil. In general, particularly if a high type of vegetable oil be used in the process, it will be desirable to leave a definite quantity of the oil in the yeast. In this manner the low fat content of yeast can be increased to any extent desired.

As already stated, the yeast thus treated will be found of a rather pleasing taste and entirely free from the aforementioned "yeasty" taste, nevertheless it will not be considered a particularly desirable food owing to what may be called its lack of "character." An advance in flavor is scored by "peptizing" the yeast before commingling it with the dehydrating oil. Such peptizing may be accomplished by an exposure to heat for many hours at as low as 125° F., but even better if said yeast be commingled with substances that induce the "peptizing" phenomena.

In such "peptizing" operation the locus of the moisture content of the yeast, generally in excess of 75%, is changed largely from the inside of the yeast cells to the outside with consequent liquefaction of the product. An excess of salt will produce this but the resultant product would be too salty for use. Singularly suited for the purpose are the amino acids or their alkali metal salts in almost any combination.

Inasmuch as the yeast complex of amino acids includes all the "essential" amino acids required in human nutrition it follows that the amino acids derived from hydrolysing yeast will be found particularly suited for such a peptizing operation. Such a combination of amino acids may be added merely as a hydrolysed product or refined to any extent required, or partly neutralized with alkali metal bases.

In any event, such an admixture will not only modify the taste of the dehydrated yeast but it will greatly increase its value in nutrition. Incidentally it will be possible to add "seasoning," spices, and condiments to any extent desired in order to fit the basal complex of carbohydrate, protein, amino acids, fats and vitamins into an exceedingly concentrated food product of almost universal application.

While the addition of all such additive material is preferably made to the yeast in the peptizing operation, it can be added elsewhere to some effect. Thus, a dehydrated yeast containing a certain percentage of a vegetable oil prepared in accordance with the disclosure herein made, can be subsequently commingled with amino acids and condiments into a very pleasing product though inferior to that prepared by making such an admixture prior to the dehydration.

The various methods of hydrolysing yeast or other proteins into the constituent amino acids and refining the resultant product is too well known to require description here. It is manifestly entirely beyond the boundaries of this disclosure. This process deals only with the use of such material in increasing the flavor and nutrient qualities of yeast and in the processing of said yeast so as to make it a more desirable addition to our food supply.

Neither does it seem necessary to go into details as to the apparatus required. Any tank fitted with an agitator will serve to commingle oil and a peptized yeast. If said tank be closed and fitted with heating coils it can be connected to a vacuum system and thus become a dehydrator. Manifestly, the oil itself can be preheated separately and apart from the yeast, said yeast then commingled, and the mixture drawn into a vacuum chamber for final dehydration. A filter press can then remove the major part of the oil, and further pressing as much more as is desired using only conventional apparatus for such work.

Having thus fully described my process, I claim:

The method of processing yeast which comprises; emulsifying a mixture of peptized yeast and oil, said oil having first been preheated to approximately 212° F., and being in amount at least ten times the weight of the yeast; subjecting said mixture to the effect of vacuum to dehydrate same; separating the dehydrated yeast from the oil; and returning the separated oil to fresh admixture with peptized yeast in a cyclic process of yeast dehydration.

ALFRED M. THOMSEN.

REFERENCES CITED

The following references are of record in the file of this patent:

UNITED STATES PATENTS

| Number | Name | Date |
|---|---|---|
| 1,015,891 | Ikeda et al. | Jan. 30, 1912 |
| 1,386,361 | Penniman | Aug. 2, 1921 |
| 1,546,820 | Ballard | July 21, 1925 |
| 1,633,711 | Prince | June 28, 1927 |
| 2,136,399 | Schultz | Nov. 15, 1938 |

FOREIGN PATENTS

| Number | Country | Date |
|---|---|---|
| 4,365 | Great Britain | of 1906 |
| 181,076 | Great Britain | of 1922 |

OTHER REFERENCES

Food Materials and Equipment, July, 1944, "Yeast, too, Needs Enriching."